(12) United States Patent
Narasimhan et al.

(10) Patent No.: US 10,402,281 B2
(45) Date of Patent: Sep. 3, 2019

(54) DYNAMIC CAPSULE GENERATION AND RECOVERY IN COMPUTING ENVIRONMENTS

(71) Applicant: INTEL CORPORATION, Santa Clara, CA (US)

(72) Inventors: Krishnakumar Narasimhan, Hillsboro, OR (US); Nicholas J. Adams, Hillsboro, OR (US); Karunakara Kotary, Portland, OR (US); Brett P Wang, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 262 days.

(21) Appl. No.: 15/086,293

(22) Filed: Mar. 31, 2016

(65) Prior Publication Data

US 2017/0286086 A1 Oct. 5, 2017

(51) Int. Cl.
*G06F 11/14* (2006.01)
*G06F 21/57* (2013.01)
*G06F 8/654* (2018.01)

(52) U.S. Cl.
CPC .......... *G06F 11/1469* (2013.01); *G06F 8/654* (2018.02); *G06F 21/572* (2013.01); *G06F 2201/84* (2013.01)

(58) Field of Classification Search
CPC ...... G06F 8/65; G06F 11/1469; G06F 21/572; G06F 2201/84
See application file for complete search history.

(56) References Cited

U.S. PATENT DOCUMENTS

| | | | | |
|---|---|---|---|---|
| 2009/0327679 | A1* | 12/2009 | Huang | G06F 9/4406 713/2 |
| 2015/0270960 | A1* | 9/2015 | Ponsini | G06F 21/62 713/189 |
| 2016/0202964 | A1* | 7/2016 | Butcher | G06F 8/65 717/172 |

* cited by examiner

*Primary Examiner* — Wei Y Zhen
*Assistant Examiner* — Amir Soltanzadeh
(74) *Attorney, Agent, or Firm* — Womble Bond Dickinson (US) LLP

(57) ABSTRACT

A mechanism is described for facilitating dynamic capsule generation and recovery in computing environments according to one embodiment. A method of embodiments, as described herein, includes accessing a current firmware and a capsule driver binary file ("capsule file") from a storage device, and merging the current firmware with the capsule file and a capsule header into a capsule payload. The method may further include assigning a security protocol to the capsule payload to ensure a secured capsule payload, and storing the secured capsule payload at the storage device for subsequent updates.

24 Claims, 6 Drawing Sheets

DYNAMIC CAPSULE GENERATION AND RECOVERY IN COMPUTING ENVIRONMENTS

FIELD

Embodiments described herein generally relate to computers. More particularly, embodiments relate to facilitating dynamic capsule generation and recovery in computing environments.

BACKGROUND

System on Chip ("SoC" or "SOC") vendors and their original equipment manufacturer (OEM) partners often push firmware update on computing devices being used by end-users in field to provide feature enhancements, security fixes, bug fixes, support rollback, and recovery options, etc.

However, conventional techniques are inefficient, cumbersome, and problematic, such as a) difficult maintenance due to forcing platform boot firmware to have firmware update driver code related to platform boot/device code, which includes flash cost and duplicates the work, making it hard maintain; b) security vulnerabilities around rollback due to raw binary scheme not capable of signing images using trusted execution environment (TEE) being keymaster; and c) wastage of space and other system resources due to backing up of copies of capsule images of previous and current copies, which forces wastage of space on disk; and/or the like.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique for offering dynamic generation of capsule payloads by coupling an existing firmware image on a computing device or platform with an exact capsule update driver from a new payload, while ensuring the signing of the package is performed with the help of platform TEE. This novel technique provides for each capsule image that is backed has a driver/firmware image portion with security governance, ensures at least one copy is backed up, and further that each backed up capsule is signed with a key-master, such as platform TEE.

In one embodiment, platform firmware may receive a capsule payload, such as over a cloud network or from a local storage medium, where a capsule update driver in the capsule payload is then launched to initiate a firmware update. This update driver may verify version numbers to proceed further or abort the update. To provide a technique to rollback to a previous good firmware in case the new update destabilizes the platform, a new capsule payload may be generated on-the-fly. Further, to achieve a dynamic capsule payload generation, the capsule driver may combine a new capsule update driver binary, an existing platform/device firmware read from platform flash or device, and a capsule header block that is also generated. This creates a capsule payload in isolated secured memory and requests platform TEE to sign, where the platform TEE generates a private Rivest-Shamir-Adleman (RSA) key or uses the existing key stored in secured fuse and signs the capsule payload. Further, the capsule driver may store this signed image onto a file and persist it as a capsule on disk for later rollback usage.

It is contemplated and to be noted that embodiments are not limited to any particular number and type of powered devices, unpowered objects, software applications, application services, customized settings, etc., or any particular number and type of computing devices, networks, deployment details, etc.; however, for the sake of brevity, clarity, and ease of understanding, throughout this document, references are made to various sensors, cameras, microphones, speakers, display screens, user interfaces, software applications, user preferences, customized settings, mobile computers (e.g., smartphones, tablet computers, etc.), communication medium/network (e.g., cloud network, the Internet, proximity network, Bluetooth, etc.), but that embodiments are not limited as such.

Figure 1:
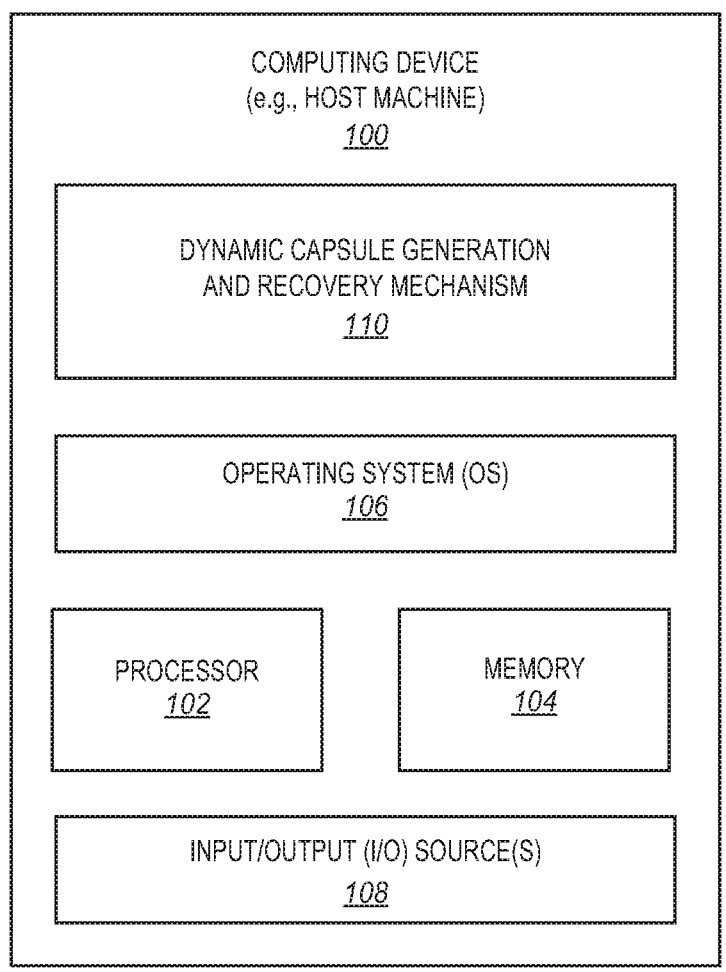
FIG. 1 illustrates a computing device employing a dynamic capsule generation and recovery mechanism according to one embodiment.
Figure 2:
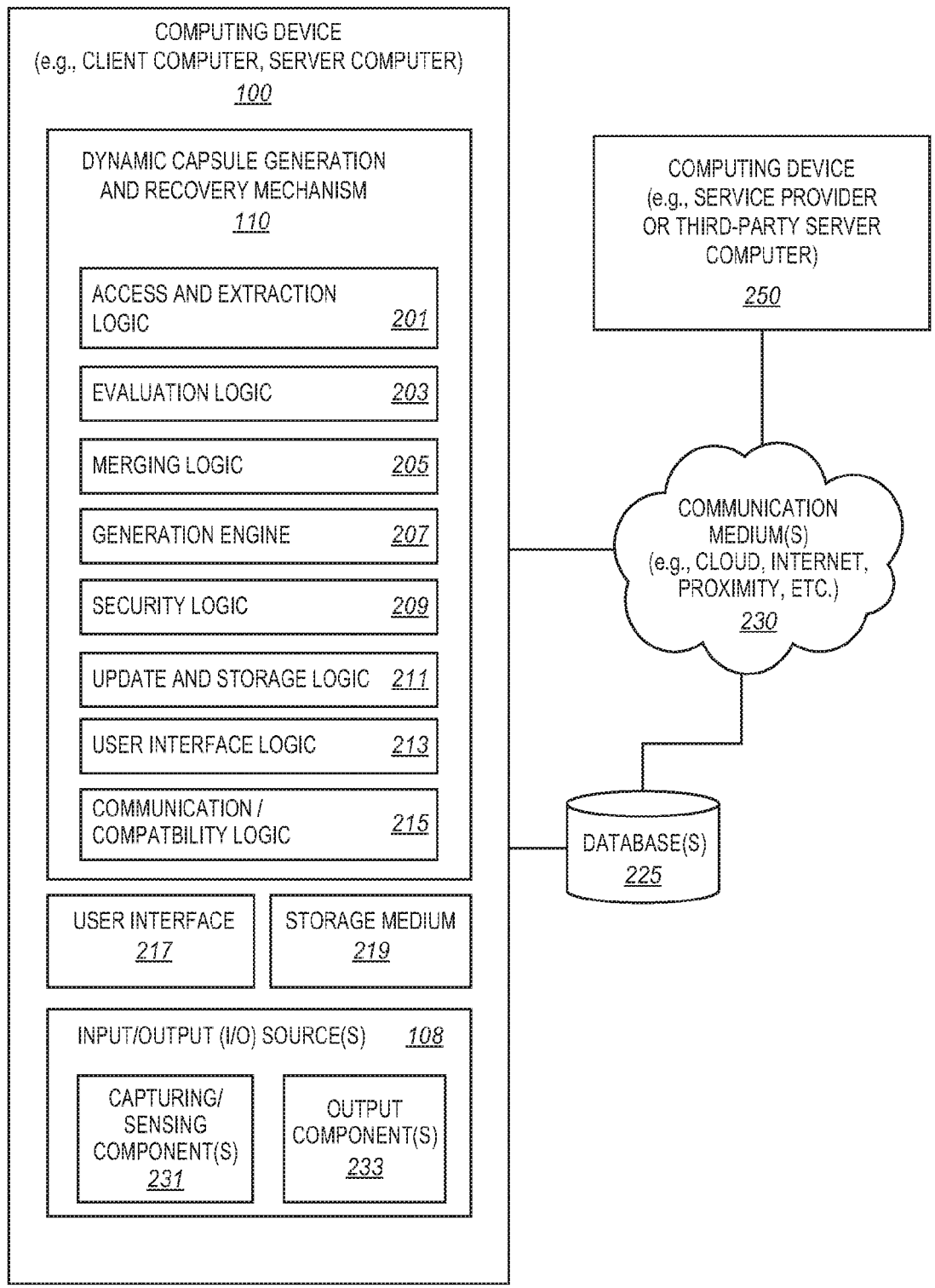
FIG. 2 illustrates a dynamic capsule generation and recovery mechanism according to one embodiment.

FIG. 1 illustrates a computing device 100 employing a dynamic capsule generation and recovery mechanism ("capsule mechanism") 110 according to one embodiment. Computing device 100 (e.g., server computer, desktop computer, mobile computer, etc.) serves as a host machine for hosting capsule mechanism 110 that includes any number and type of components, as illustrated in FIG. 2, to facilitate smart generation of voxel representations and assigning trust levels to such voxel representations based on, for example, various sources or origins of images that are used for composing voxel representations, as will be further described throughout this document.

Computing device 100 may include any number and type of data processing devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, Internet of Things (IoT) devices, head-mounted displays (HMDs) (e.g., wearable glasses, head-mounted binoculars, gaming displays, military headwear, etc.), and other wearable devices (e.g., smartwatches, bracelets, smartcards, jewelry, clothing items, etc.), and/or the like.

Computing device 100 may include an operating system (OS) 106 serving as an interface between hardware and/or physical resources of the computer device 100 and a user. Computing device 100 further includes one or more processor(s) 102, memory devices 104, network devices, drivers, or the like, as well as input/output (I/O) sources 108, such as touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a person or a group of individuals or persons using or having access to one or more computing devices, such as computing device 100.

FIG. 2 illustrates capsule mechanism 110 of FIG. 1 according to one embodiment. In one embodiment, capsule mechanism 110 may include any number and type of components, such as (without limitation): access and extraction logic ("access logic") 201; evaluation logic 203; merging logic 205; generation engine 207; security logic 209; update and storage logic 211; user interface logic 213; and communication/compatibility logic 215. Computing device 100 is further shown to offer user interface 217 and have I/O source(s) 108 including capturing/sensing component(s) 231 and output component(s) 233. Computing device 100 is further illustrated as having local storage medium 219 and being in communication with one or more database(s) 225. User interface 217 may include one or more of a graphical user interface (GUI)-based user interface, a Web browser, an application-based user interface (e.g., mobile application-based user interface, etc.).

In some embodiments, computing device 100 may be in communication with one or more other computing devices, such as computing device 250, serving as service provider server computers, third-party computers, and/or the like. For example, a service provider or a third-party may include an entity or an organization (e.g., company, business entity, etc.) that may have provided software, hardware, and/or firmware to computing device 100 and may also be responsible for offering any updates or upgrades to those software, hardware, and/or firmware.

Further, in one embodiment, capsule mechanism 110 may be hosted entirely by computing device 100, or, in another embodiment, one or more components of capsule mechanism 110 may be hosted by one or more of other computers, such as computing device 250.

As aforementioned, computing device 100 may include a client computer (e.g., desktop computers, laptop computers, smartphones, tablet computers, smart wearable devices, etc.) or a server computer (e.g., cloud-based server, application server, Web server, etc.) hosting I/O sources 108 having capturing/sensing components 231 and output sources 233. In one embodiment, capturing/sensing components 231 may include sensor array (such as microphones or microphone array (e.g., ultrasound microphones), cameras or camera array (e.g., two-dimensional (2D) cameras, 3D cameras, infrared (IR) cameras, depth-sensing cameras, etc.), capacitors, radio components, radar components, etc.), scanners, etc., while output components may include display screens/devices, projectors, speakers, etc.

As aforementioned, computing device 100 may be further in communication with one or more repositories, data sources, databases, such as database(s) 225, having any amount and type of information, such as data, metadata, etc., relating to any number and type of applications, such as world views or images, data/metadata relating to geographical locations and/or images sources (e.g., cameras, satellites, etc.), security data, user preferences and/or profiles, driver binary files, current firmware, capsule payloads, security keys and/or protocols, and/or the like.

In one embodiment, a platform having to enable rollback schemes or seamless recovery schemes ensure user fallback to a previously existing good copy of the firmware in case the newly updated copy is inappropriate or faulty that is capable of messing up system stability or computing device functionality, security, and/or power efficiency, etc. As part of a new firmware update flow, such as raw binary scheme, an existing copy of the device and/or platform firmware that is regarded as the target for the update may be backed up on a disk or system partition (e.g., extensible firmware interface (EFI) system partition, etc.) as a raw firmware image.

As will be further described in this document, for example, as facilitated by merging logic 205, capsule-based (e.g., EFI capsule-based) firmware binary package may involve two binaries or binary files that are packaged or merged into one, where, for example, the two binaries may include 1) driver binary (e.g., UEFI driver binary) that knows how to securely update platform and/or device firmware, and 2) firmware binary that needs to be updated. This novel technique for adoption of raw binary schemes forces the firmware to embed firmware update logic, such as firmware update and storage logic 211, for platform firmware and/or device firmware within or inside flash resident firmware.

Conventional techniques of backing up the raw firmware binary of platform on EFI partition defeats the security aspect and also forces platform designer to include the code to handle the firmware update for platform and devices within the boot firmware, which increases the flash store cost and research and development (R&D) and/or engineering burden, while making it touch to scale a rollback scheme to multiple devices on platform bill of materials (BOM). Other conventional techniques require keeping multiple copies at storage devices consumes more storage space for platform maintenance and reduces space for end-users.

Referring back to capsule mechanism 110, in one embodiment, access logic 201 may receive or detect a request for a new update or upgrade to local platform and/or device firmware updates, where the request may include an automated request received from or through a local storage, such as storage medium 219, one or more local or remote databases, such as database(s) 225, one or more other computing devices, such as computing device 250, over communication medium(s) 230, such as a cloud network, the Internet, etc. For example, the update request may be issued by a service provider (e.g., proprietor of software, hardware, and/or firmware, etc.) or a third-party vendor (e.g., broker of software, hardware, and/or firmware, etc.) from computing device 250 serving a server computer and received at computing device 100 serving as a user/client computer.

In one embodiment, access logic 201 is further to facilitate a capsule driver responsible for updating (such as responsible for updating platform boot firmware and/or device firmware) to read any existing file relating to the firmware from a device store, platform flash, etc., such as from storage medium 219, etc., and write in memory, such as memory 108 of FIG. 1, under a secure environment. In one embodiment, access logic 201 is further to facilitate the capsule driver to extract firmware update driver binary from the new capsule binary it received and writes in memory under a secure environment.

Upon extracting the relevant files having pertinent information, evaluation logic 203 may be triggered to evaluate or parse any pertinent information to determine whether the information is valid, appropriate, and up-to-date to trigger any subsequent processes leading to updating of the platform and/or device firmware. For example, if any of the pertinent information, such as binaries, is regarded as flawed, inappropriate, incomplete, or insufficient, etc., the process may be terminated so that the firmware update may be cancelled or proponed until new files having new firmware update information is received. However, if the pertinent information, such as binaries, is complete and acceptable, the process may be moved forward towards updating of the firmware. For example, generation engine 207 may be triggered to facilitate generation of a capsule header that identifies or specifies system location for relevant data, such as signatures, etc. In one embodiment, merging logic 205 may be triggered to merge to stitch together the three binaries extracted or created in previous processes per the required layout.

Then, in one embodiment, security logic 209 is triggered to arrange for security to ensure secured updating or launching by calling on platform TEE having a keymaster to generate, for example, RSA keys and sign this pertinent information on-the-fly to create the firmware image with capsule. Further, in one embodiment, update and storage logic 211 to facilitate the capsule driver to backup this newly-created backed up and signed capsule image firmware on a disk, such as storage medium 219, database(s) 225, etc.

In one embodiment, update and storage logic 211 is further to, during the rollback flow, facilitate the platform firmware to work with TEE to authenticate the backed up firmware image and capsule that are then launched by update and storage logic 211 in a secure environment to back up the previous good copy of the firmware.

Capturing/sensing components 231 at computing device 100 and/or any I/O component(s) at computing device 250 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing component(s) 231 may further include one or more of supporting or supplemental devices for capturing and/or sensing of data, such as illuminators (e.g., IR illuminator), light fixtures, generators, sound blockers, etc.

It is further contemplated that in one embodiment, capturing/sensing component(s) 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, capturing/sensing component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Capturing/sensing component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiments are not limited to any particular number or type of use-case scenarios; however, for the sake of brevity and clarity, one or more use-case scenarios are discussed throughout this document for exemplary purposes but that embodiments are not limited as such. For example, Wind River® Simics® simulator, UEFI firmware, and/or the like, are discussed throughout this document, but that embodiments are not limited as such. Further, throughout this document, "user" may refer to someone having access to one or more computing devices, such as computing device 250, and may be referenced interchangeably with "person", "individual", "human", "him", "her", "child", "adult", "viewer", "player", "gamer", "software/system developer", "software/system programmer", "system administrator", and/or the like.

Communication/compatibility logic 211 may be used to facilitate dynamic communication and compatibility between various components, networks, computing devices, etc., such as computer 100, computer 250, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and/or the like, may be referenced interchangeably and include, by way of example, software, hardware, and/or any combination of software and hardware, such as firmware. In one example, "logic" may refer to or include a software component that is capable of working with one or more of an operating system, a graphics driver, etc., of a computing device, such as computing device 100, 250. In another example, "logic" may refer to or include a hardware component that is capable of being physically installed along with or as part of one or more system hardware elements, such as an application processor, a graphics processor, etc., of a computing device, such as computing devices 100, 250. In yet another embodiment, "logic" may refer to or include a firmware component that is capable of being part of system firmware, such as firmware of an application processor or a graphics processor, etc., of a computing device, such as computing device 100, 250.

Further, any use of a particular brand, word, term, phrase, name, and/or acronym, such as "simulator", "firmware", "boot firmware", "virtual platform", "user interface", "package", "tools", "firmware engine", "specification document", "database of components", "firmware component implementations", "virtual platform component implementations", "UEFI", "BOM", "binary image management", "capsule", "firmware", "driver binary", "capsule payload", "capsule header", "TEE", "capsule bin", "platform firmware", "device firmware", "firmware image", "camera", "sensor", "microphone", "display screen", "speaker", "recognition", "authentication", "privacy", "user", "user profile", "user preference", "sender", "receiver", "personal device", "smart device", "mobile computer", "wearable device", "IoT", "IoT device", "proximity network", "cloud network", "server computer", etc., should not be read to limit embodiments to software or devices that carry that label in products or in literature external to this document.

It is contemplated that any number and type of components may be added to and/or removed from capsule mechanism 110 to facilitate various embodiments including adding, removing, and/or enhancing certain features. For brevity, clarity, and ease of understanding of capsule mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3:
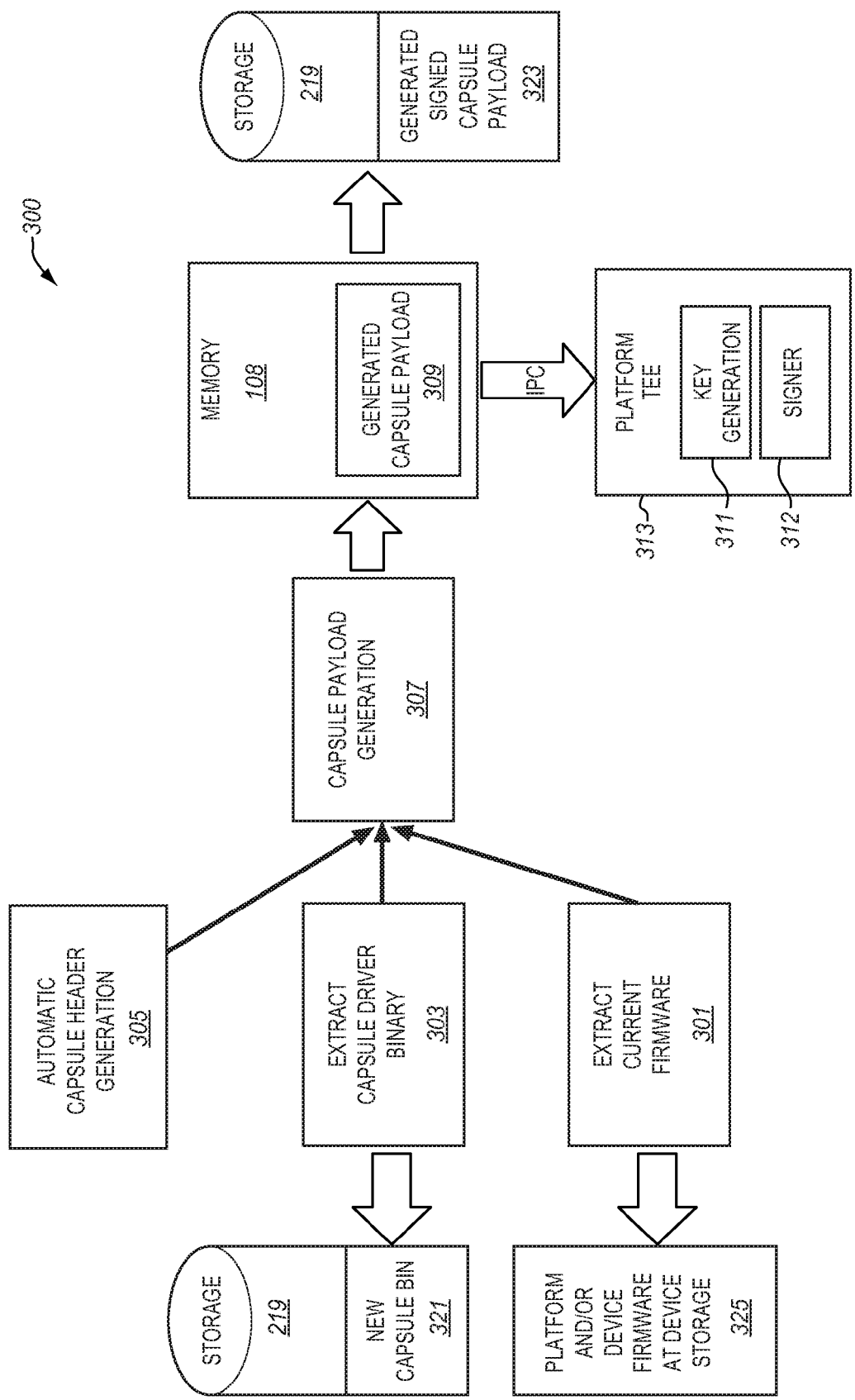
FIG. 3 illustrates a transaction sequence for facilitating dynamic capsule generation and recovery according to one embodiment.

FIG. 3 illustrates a transaction sequence 300 for facilitating dynamic capsule generation and recovery according to one embodiment. Transaction sequence 300 may be performed by processing logic that may comprise hardware (e.g., circuitry, dedicated logic, programmable logic, etc.), software (such as instructions run on a processing device), or a combination thereof, as facilitated by capsule mechanism 110 of FIG. 1. The processes of capsule mechanism 110 are illustrated in linear sequences for brevity and clarity in presentation; however, it is contemplated that any number of them can be performed in parallel, asynchronously, or in different orders. For brevity, many of the details discussed with reference to the previous FIGS. 1-2 may not be discussed or repeated hereafter.

Transaction sequence 300 provides for firmware (e.g., platform UEFI firmware, device firmware, etc.) to receive a capsule payload for updating the firmware and securely launch the capsule. In one embodiment, a computing device, such as computing device 100 of FIG. 1, may host storage 325 for storing platform firmware and/or platform device 325 along with another storage 219 having new capsule bin 321 having a capsule relating to the platform and/or device firmware that needs updating. In one embodiment, storage 325 may one of database(s) 225 or, in another embodiment, storage 325 may be the same as storage 219, and, in yet another embodiment, storage 325 may be a separate storage, such as a standalone storage disk. Similarly, in one embodiment, storage 219 may be one of database(s) 225 or, in another embodiment, storage 219 may be the same as storage 325, and, in yet another embodiment, storage 219 may be a separate storage, such as a standalone storage disk.

In one embodiment, an update request for updating or upgrading of the firmware may be received by capsule mechanism 110 at a primary computing device, such as computing device 100 of FIG. 1, where the request may be initiated from a local storage, such as storage 219, and/or from another local or remote computing device, such as service provider and/or third-party server computer 250 of FIG. 2.

Upon detecting the request, in one embodiment, at block 301, transaction sequence 300 proceeds with extraction of current firmware from storage 325 as facilitated by access logic 201 of FIG. 2, wherein this current firmware is extracted by facilitating a capsule driver to read the existing good firmware from platform flash or device storage 325 and then write in memory under a secure environment. This capsule driver may be the one responsible for updating the platform boot firmware and/or device firmware. Similarly, in one embodiment, at block 303, capsule or firmware update driver binary is extracted from new capsule bin 321 at storage 219 also facilitated by access logic 201 of FIG. 2 and write in memory under secure environment. Upon performing the two extractions, at block 305, the capsule update driver may be facilitated to generate a capsule header and assigned it to the capsule driver binary as facilitated by generation engine 207 of FIG. 2.

In one embodiment, merging logic 205 of FIG. 2 may be triggered at block 307 to merge or stitch together the two aforementioned extractions and the capsule header into a capsule payload as facilitated by generation logic 207 of FIG. 2, where, as illustrated, newly-generated capsule payload 309 is then stored at memory 108. In one embodiment, as facilitated by security logic 209, the capsule update driver may be used to call on platform TEE 313 which has the keymaster to generate keys 311, such as RSA keys, that are then used by signer 312 to assign a signature, on-the-fly, to newly-generated capsule payload 309 including firmware image and capsule. For example, communication between memory 108 hosting generated capsule and platform TEE 313 may be facilitated through inter-process communication (IPC).

Further, in one embodiment, update and storage logic 211 of FIG. 2 may facilitate the capsule driver to back up this newly-generated capsule payload 309 on a disk, such as storage 219, as signed capsule payload 323. Further, during the rollback flow, the platform firmware may work with platform TEE 313 to authenticate the backed up capsule payload 323, including the firmware image and the capsule, and launch it in a secure environment to back up the previous good copy of the firmware as facilitated by update and storage logic 211 of FIG. 2.

Figure 4:
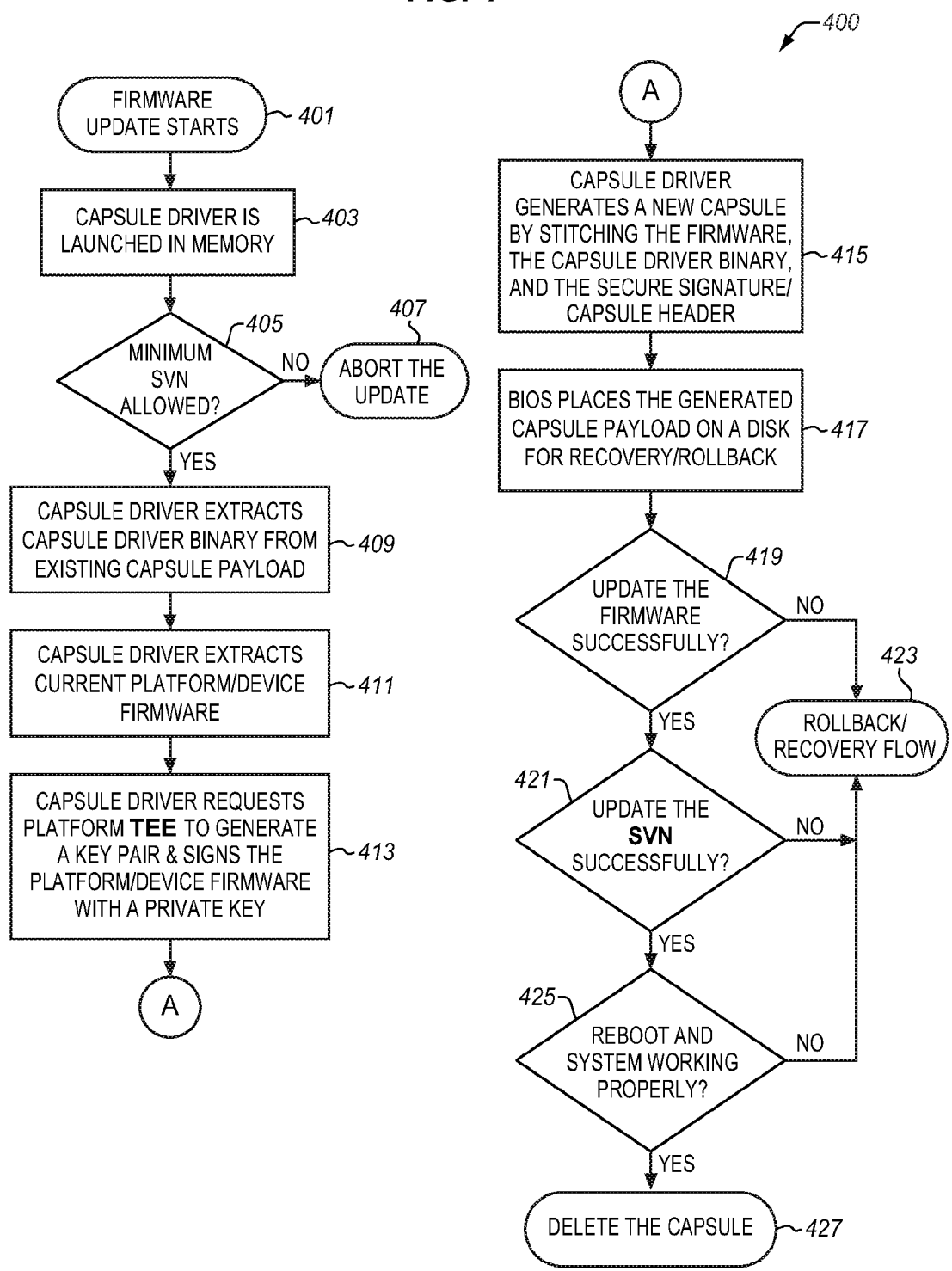
FIG. 4 illustrates a method for facilitating dynamic capsule generation and recovery according to one embodiment.

FIG. 4 illustrates a method 400 for facilitating dynamic capsule generation and recovery according to one embodiment. Method 400 may be performed by processing logic that may comprise hardware (e.g., circuitry, dedicated logic, programmable logic, etc.), software (such as instructions run on a processing device), or a combination thereof, as facilitated by capsule mechanism 110 of FIG. 1. The processes of capsule mechanism 110 are illustrated in linear sequences for brevity and clarity in presentation; however, it is contemplated that any number of them can be performed in parallel, asynchronously, or in different orders. For brevity, many of the details discussed with reference to the previous FIGS. 1-3 may not be discussed or repeated hereafter.

Method 400 begins at block 401 with starting of the process for updating of firmware (e.g., platform firmware and/or device firmware), such as in response to an indication or request for update received at a computing device as described previously with respect to FIG. 3. At block 403, a capsule driver, as facilitated by capsule mechanism 110 of FIG. 1, is launched in memory. It is contemplated that in some embodiments, "capsule driver" may be referenced or used interchangeably with one or more components of capsule mechanism 110 of FIG. 1 to facilitate or perform one or more tasks of capsule mechanism 110 of FIG. 1. At block 405, a determination is made as to whether a minimum subversion (SVN) allowed. If not, method 400 ends at block 407. If yes, method 400 continues at block 409 with the capsule driver, as facilitated by capsule mechanism 110 of FIG. 1, extracting a capsule driver binary from an existing capsule payload at the computing device. At block 411, the capsule driver, as facilitated by capsule mechanism 110 of FIG. 1, further extracts the exiting platform and/or device firmware from the local storage or disk at the computing device.

At block 413, the capsule driver, as facilitated by capsule mechanism 110 of FIG. 1, requests a platform TEE to generate a key pair and sign the platform and/or device firmware with a private key of the key pair. At block 415, the capsule driver, as facilitated by capsule mechanism 110 of FIG. 1, may generate a new capsule by merging or stitching together tow or more of the extracted platform and/or device firmware, the extracted capsule driver binary, and the secure signature and/or capsule header to generate a new capsule payload. At block 417, basic input/output system (BIOS), as facilitated by capsule mechanism 110 of FIG. 1, may place the generated capsule payload in local storage, such as on a disk, for recovery and/or rollback.

At block 419, a determination is made as to whether the firmware is updated successfully. If not, method 400 continues with recovery or rollback flow at block 423. If yes, at block 421, another determination is made as to whether the SVN has been updated successfully. If not, method 400 continues with recovery or rollback flow at block 423. If yes, at block 425, another determination is made as to whether the reboot and system are properly working. If not, method 400 continues with recovery or rollback flow at block 423. If yes, the capsule is deleted and method 400 ends at block 427.

Figure 5:
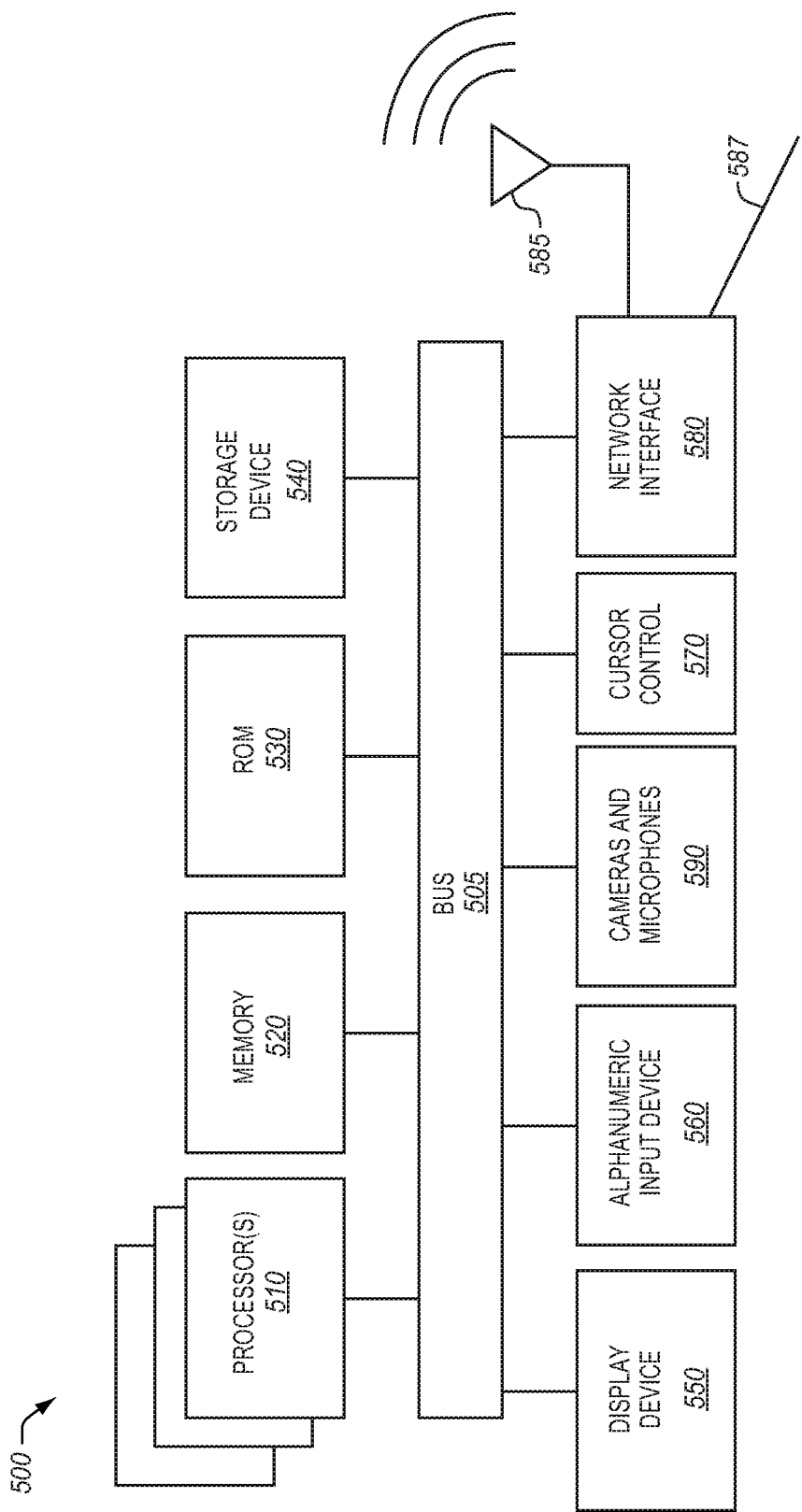
FIG. 5 illustrates computer environment suitable for implementing embodiments of the present disclosure according to one embodiment.

FIG. 5 illustrates an embodiment of a computing system 500 capable of supporting the operations discussed above. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 500 may be the same as or similar to or include computing devices 100, 250 described in reference to FIG. 2.

Computing system 500 includes bus 505 (or, for example, a link, an interconnect, or another type of communication device or interface to communicate information) and processor 510 coupled to bus 505 that may process information. While computing system 500 is illustrated with a single processor, it may include multiple processors and/or co-processors, such as one or more of central processors, image signal processors, graphics processors, and vision processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 6:
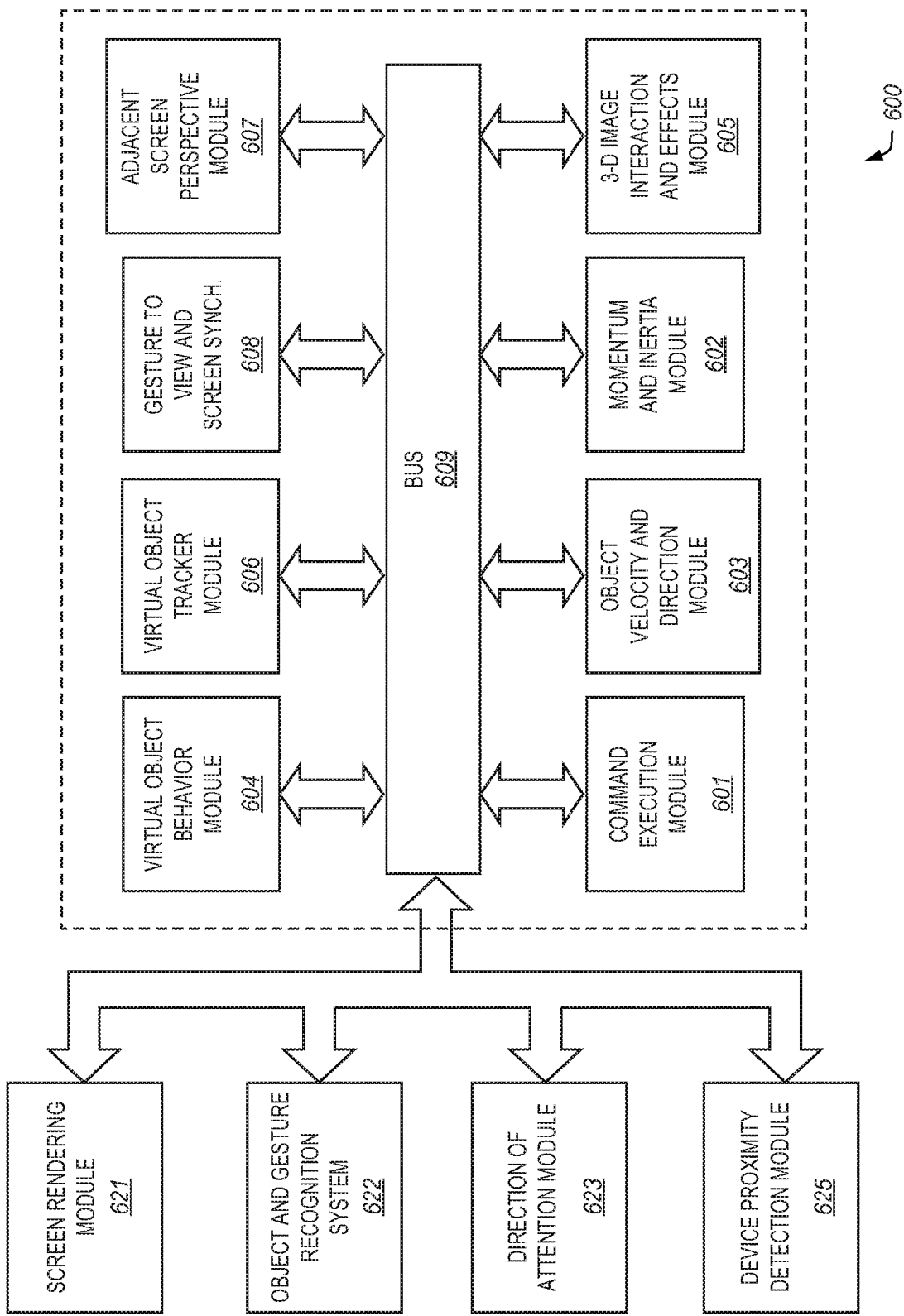
FIG. 6 illustrates a method for facilitating dynamic targeting of users and communicating of message according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 622 may be adapted to recognize and track hand and arm gestures of a user. Such as module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition System 622. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition System 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605. 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate dynamic capsule generation and recovery in computing environments, the apparatus comprising: access and extraction logic ("access logic") to access a current firmware and a capsule driver binary file ("capsule file") from a storage device; merging logic to merge the current firmware with the capsule file and a capsule header into a capsule payload; security logic to assign a security protocol to the capsule payload to ensure a secured capsule payload; and update and storage logic to store the secured capsule payload at the storage device for subsequent updates.

Example 2 includes the subject matter of Example 1, wherein the current firmware comprises at least one of platform firmware or device firmware.

Example 3 includes the subject matter of Example 1, further comprising generation engine to generate at least one of the capsule header and the capsule payload.

Example 4 includes the subject matter of Example 1, wherein the security protocol comprises a signature based on one or more private keys, wherein the one or more private keys are generated by calling into a trusted execution environment (TEE).

Example 5 includes the subject matter of Example 1, wherein the secured capsule payload at the storage device serves as a backup of a previous good copy if one or more of firmware images or capsule files are launched in future in a secured environment, wherein the secured capsule payload is further used for potential recoveries or rollbacks.

Example 6 includes the subject matter of Example 1, wherein the current firmware and the capsule file are extracted and then written into memory.

Example 7 includes the subject matter of Example 1, wherein the update and storage logic is further to update at least one of the platform firmware and the device firmware using the secured capsule payload.

Example 8 includes the subject matter of Example 1, wherein the access logic is further to receive an update request, wherein the request is initiated locally at the apparatus or received from a computing device including a server computer representing a service provider, wherein the update request to indicate updating of at least one of the platform firmware and the device firmware Some embodiments pertain to Example 9 that includes a method for facilitating dynamic capsule generation and recovery in computing environments, the method comprising: accessing a current firmware and a capsule driver binary file ("capsule file") from a storage device; merging the current firmware with the capsule file and a capsule header into a capsule payload; assigning a security protocol to the capsule payload to ensure a secured capsule payload; and storing the secured capsule payload at the storage device for subsequent updates.

Example 10 includes the subject matter of Example 9, wherein the current firmware comprises at least one of platform firmware or device firmware.

Example 11 includes the subject matter of Example 9, further comprising: generating at least one of the capsule header and the capsule payload.

Example 12 includes the subject matter of Example 9, wherein the security protocol comprises a signature based on one or more private keys, wherein the one or more private keys are generated by calling into a trusted execution environment (TEE).

Example 13 includes the subject matter of Example 9, wherein the secured capsule payload at the storage device serves as a backup of a previous good copy if one or more of firmware images or capsule files are launched in future in a secured environment, wherein the secured capsule payload is further used for potential recoveries or rollbacks.

Example 14 includes the subject matter of Example 9, wherein the current firmware and the capsule file are extracted and then written into memory.

Example 15 includes the subject matter of Example 9, further comprising: updating at least one of the platform firmware and the device firmware using the secured capsule payload.

Example 16 includes the subject matter of Example 9, wherein accessing further comprises receiving an update request, wherein the request is initiated locally at the apparatus or received from a computing device including a server computer representing a service provider, wherein the update request to indicate updating of at least one of the platform firmware and the device firmware.

Some embodiments pertain to Example 17 includes a system comprising a storage device having instructions, and a processor to execute the instructions to facilitate a mechanism to: access a current firmware and a capsule driver binary file ("capsule file") from a storage device; merge the current firmware with the capsule file and a capsule header into a capsule payload; assign a security protocol to the capsule payload to ensure a secured capsule payload; and store the secured capsule payload at the storage device for subsequent updates.

Example 18 includes the subject matter of Example 17, wherein the current firmware comprises at least one of platform firmware or device firmware.

Example 19 includes the subject matter of Example 17, wherein the mechanism is further to: generate at least one of the capsule header and the capsule payload.

Example 20 includes the subject matter of Example 17, wherein the security protocol comprises a signature based on one or more private keys, wherein the one or more private keys are generated by calling into a trusted execution environment (TEE).

Example 21 includes the subject matter of Example 17, wherein the secured capsule payload at the storage device serves as a backup of a previous good copy if one or more of firmware images or capsule files are launched in future in a secured environment, wherein the secured capsule payload is further used for potential recoveries or rollbacks.

Example 22 includes the subject matter of Example 17, wherein the current firmware and the capsule file are extracted and then written into memory.

Example 23 includes the subject matter of Example 17, wherein the mechanism is further to: update at least one of the platform firmware and the device firmware using the secured capsule payload.

Example 24 includes the subject matter of Example 17, wherein accessing further comprises receiving an update request, wherein the request is initiated locally at the apparatus or received from a computing device including a server computer representing a service provider, wherein the update request to indicate updating of at least one of the platform firmware and the device firmware.

Some embodiments pertain to Example 25 includes an apparatus comprising: means for accessing a current firmware and a capsule driver binary file ("capsule file") from a storage device; means for merging the current firmware with the capsule file and a capsule header into a capsule payload; means for assigning a security protocol to the capsule payload to ensure a secured capsule payload; and means for storing the secured capsule payload at the storage device for subsequent updates.

Example 26 includes the subject matter of Example 25, wherein the current firmware comprises at least one of platform firmware or device firmware.

Example 27 includes the subject matter of Example 25, further comprising: means for generating at least one of the capsule header and the capsule payload.

Example 28 includes the subject matter of Example 25, wherein the security protocol comprises a signature based on one or more private keys, wherein the one or more private keys are generated by calling into a trusted execution environment (TEE).

Example 29 includes the subject matter of Example 25, wherein the secured capsule payload at the storage device serves as a backup of a previous good copy if one or more of firmware images or capsule files are launched in future in a secured environment, wherein the secured capsule payload is further used for potential recoveries or rollbacks.

Example 30 includes the subject matter of Example 25, wherein the current firmware and the capsule file are extracted and then written into memory.

Example 31 includes the subject matter of Example 25, further comprising: means for updating at least one of the platform firmware and the device firmware using the secured capsule payload.

Example 32 includes the subject matter of Example 25, wherein accessing further comprises receiving an update request, wherein the request is initiated locally at the apparatus or received from a computing device including a server computer representing a service provider, wherein the update request to indicate updating of at least one of the platform firmware and the device firmware.

Example 33 includes at least one non-transitory machine-readable medium comprising a plurality of instructions, when executed on a computing device, to implement or perform a method as claimed in any of claims or examples 9-16.

Example 34 includes at least one machine-readable medium comprising a plurality of instructions, when executed on a computing device, to implement or perform a method as claimed in any of claims or examples 9-16.

Example 35 includes a system comprising a mechanism to implement or perform a method as claimed in any of claims or examples 9-16.

Example 36 includes an apparatus comprising means for performing a method as claimed in any of claims or examples 9-16.

Example 37 includes a computing device arranged to implement or perform a method as claimed in any of claims or examples 9-16.

Example 38 includes a communications device arranged to implement or perform a method as claimed in any of claims or examples 9-16.

Example 39 includes at least one machine-readable medium comprising a plurality of instructions, when executed on a computing device, to implement or perform a method or realize an apparatus as claimed in any preceding claims or examples.

Example 40 includes at least one non-transitory machine-readable medium comprising a plurality of instructions, when executed on a computing device, to implement or perform a method or realize an apparatus as claimed in any preceding claims or examples.

Example 41 includes a system comprising a mechanism to implement or perform a method or realize an apparatus as claimed in any preceding claims or examples.

Example 42 includes an apparatus comprising means to perform a method as claimed in any preceding claims or examples.

Example 43 includes a computing device arranged to implement or perform a method or realize an apparatus as claimed in any preceding claims or examples.

Example 44 includes a communications device arranged to implement or perform a method or realize an apparatus as claimed in any preceding claims or examples.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   one or more processors;
   an access logic to:
      receive a request to update a platform of the apparatus; and responsive to the request, to access a current firmware of the platform;
   an extraction logic to:
      extract a first capsule driver from a first capsule payload at the apparatus; and
      extract the current firmware from a storage device responsive to the request;
   a merging logic to merge the current firmware, the first capsule driver with a capsule header into a second capsule payload;
   a security logic to assign a security protocol to secure the second capsule payload; and
   an update and storage logic to store the secured second capsule payload at the storage device, wherein the secured second capsule payload supports a rollback of the update to the platform of the apparatus.

2. The apparatus of claim 1, wherein the current firmware comprises at least one of platform firmware or device firmware.

3. The apparatus of claim 1, further comprising a generation engine to generate the second capsule payload.

4. The apparatus of claim 1, wherein the security protocol comprises a signature based on one or more private keys, wherein the one or more private keys are generated by calling into a trusted execution environment (TEE).

5. The apparatus of claim 1, wherein the secured second capsule payload at the storage device serves as a backup of a previous good copy if one or more of firmware images or capsule files are launched in future in a secured environment, wherein the secured second capsule payload is further used for potential recoveries or rollbacks.

6. The apparatus of claim 1, wherein the current firmware and the first capsule driver are extracted and then written into a memory.

7. The apparatus of claim 1, wherein the firmware is at least one of a platform firmware and a device firmware, and wherein the update and storage logic is further to update at least one of the platform firmware and the device firmware using the secured second capsule payload.

8. The apparatus of claim 1, wherein the request to update the platform of the apparatus is initiated locally at the apparatus or received from a computing device including a server computer representing a service provider, wherein the update request to indicate updating of at least one of the platform firmware and the device firmware.

9. A method comprising:
   receiving a request to update a platform of an apparatus, the platform having a current firmware;
   accessing the current firmware;
   extracting a first capsule driver from a first capsule payload at the apparatus; and extracting the current firmware from a storage device responsive to the request;
   merging the current firmware, the first capsule driver with a capsule header into a second capsule payload;
   assigning a security protocol to secure the second capsule payload; and
   storing the secured second capsule payload at the storage device, wherein the secured second capsule payload supports a rollback of the update to the platform of the apparatus.

10. The method of claim 9, wherein the current firmware comprises at least one of platform firmware or device firmware.

11. The method of claim 9, further comprising: generating the second capsule payload.

12. The method of claim 9, wherein the security protocol comprises a signature based on one or more private keys, wherein the one or more private keys are generated by calling into a trusted execution environment (TEE).

13. The method of claim 9, wherein the secured second capsule payload at the storage device serves as a backup of a previous good copy if one or more of firmware images or capsule drivers are launched in future in a secured environment, wherein the secured second capsule payload is further used for potential recoveries or rollbacks.

14. The method of claim 9, wherein the current firmware and the first capsule file are extracted and then written into a memory.

15. The method of claim 9, further comprising updating at least one of the platform firmware and the device firmware using the secured second capsule payload.

16. The method of claim 9, wherein the request to update the platform of the apparatus is initiated locally at the apparatus or received from a computing device including a server computer representing a service provider, wherein the update request to indicate updating of at least one of the platform firmware and the device firmware.

17. At least one machine-readable non-transitory storage medium comprising a plurality of instructions, executed on a computing device, to facilitate the computing device to perform operations comprising:
   receiving a request to update a platform of an apparatus, the platform having a current firmware;
   accessing the current firmware;
   extracting a first capsule driver from a first capsule payload at the apparatus; and extracting the current firmware from a storage device responsive to the request;
   merging the current firmware the first capsule driver with a capsule header into a second capsule payload;
   assigning a security protocol to secure the second capsule payload; and
   storing the secured second capsule payload at the storage device, wherein the secured second capsule payload supports a rollback of the update to the platform of the apparatus.

18. The machine-readable non-transitory storage medium of claim 17, wherein the current firmware comprises at least one of platform firmware or device firmware.

19. The machine-readable non-transitory storage medium of claim 17, wherein the operations further comprise generating the second capsule payload.

20. The machine-readable non-transitory storage medium of claim 17, wherein the security protocol comprises a signature based on one or more private keys, wherein the one or more private keys are generated by calling into a trusted execution environment (TEE).

21. The machine-readable non-transitory storage medium of claim 17, wherein the secured second capsule payload at the storage device serves as a backup of a previous good copy if one or more of firmware images or capsule drivers are launched in future in a secured environment, wherein the secured secured capsule payload is further used for potential recoveries or rollbacks.

22. The machine-readable non-transitory storage medium of claim 17, wherein the current firmware and the first capsule driver are extracted and then written into a memory.

23. The machine-readable non-transitory storage medium of claim 17, wherein the operations further comprise updating at least one of the platform firmware and the device firmware using the secured second capsule payload.

24. The machine-readable non-transitory storage medium of claim 17, wherein the request to update the platform of the apparatus is initiated locally at the apparatus or received from a computing device including a server computer representing a service provider, wherein the update request to indicate updating of at least one of the platform firmware and the device firmware.

\* \* \* \* \*